(12) United States Patent
Lyon

(10) Patent No.: US 8,031,557 B2
(45) Date of Patent: Oct. 4, 2011

(54) METHOD OF OPERATING AN ACOUSTIC PULSE ECHO RANGING SYSTEM

(75) Inventor: George Quinton Lyon, Peterborough (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 0 days.

(21) Appl. No.: 12/468,117

(22) Filed: May 19, 2009

(65) Prior Publication Data

US 2009/0290452 A1 Nov. 26, 2009

(30) Foreign Application Priority Data

May 19, 2008 (EP) ..................................... 08009205

(51) Int. Cl.
*G01F 23/296* (2006.01)
*G01S 15/10* (2006.01)
(52) U.S. Cl. .......................... 367/99; 367/908; 73/290 V
(58) Field of Classification Search .................. 367/101, 367/102, 908, 99; 73/290 V; 342/124
See application file for complete search history.

(56) References Cited

U.S. PATENT DOCUMENTS

| 3,212,053 | A | * | 10/1965 | Finney | 367/101 |
| 3,302,161 | A | * | 1/1967 | Ellison | 367/90 |
| 3,614,719 | A | * | 10/1971 | Treacy | 367/101 |
| 3,742,437 | A | * | 6/1973 | Thiele | 367/101 |
| 4,439,845 | A | | 3/1984 | Geohegan, Jr. et al. | |
| 6,128,249 | A | | 10/2000 | Sullivan | |
| 6,898,151 | B1 | | 5/2005 | Lyon | |
| 7,046,189 | B2 | | 5/2006 | Spanke et al. | |

* cited by examiner

*Primary Examiner* — Ian Lobo

(57) ABSTRACT

A method of operating an acoustic pulse echo ranging system is provided. A series of acoustic energy pulses of successively increasing or decreasing burst frequencies are transmitted through a transducer assembly. For each transmitted energy pulse associated echoes are received and converted into an echo function over time. The obtained echo function is stored in a two-dimensional pattern whose first dimension is the burst frequency and whose second dimension is the time. Based upon the two-dimensional pattern a frequency response function is evaluated as a function of echo function values over burst frequency at a selected point of time.

14 Claims, 2 Drawing Sheets

METHOD OF OPERATING AN ACOUSTIC PULSE ECHO RANGING SYSTEM

CROSS REFERENCE TO RELATED APPLICATIONS

This application claims priority of European Patent Application No. 08009205.9 EP filed May 19, 2008, which is incorporated by reference herein in its entirety.

FIELD OF INVENTION

The invention relates to a method of operating an acoustic pulse echo ranging system.

BACKGROUND OF INVENTION

In a number of applications, it is necessary to monitor liquids containing significant quantities of suspended materials, which materials may tend to separate or accumulate as a separate phase beneath a body of clearer liquid. Suspended material in liquids tends to absorb, reflect and disperse acoustic energy, although the extent of this effect is frequency dependent. For example, in potable water clarifiers a high frequency is required to detect very small particles in the clear phase. Such high frequency, however, does not work effectively to detect e.g. the density and level of sludge in sewerage treatment plants which, in addition, have several operating states (normal and one or more disturbed), each of them requiring different frequencies. Thus, the effectiveness of a pulse echo ranging system in monitoring such liquids will depend upon the presence of suspended material, including gas bubbles, in the supernatant layer, and the concentration and nature of particles in the layer of precipitated material.

From U.S. Pat. No. 6,898,151 a method of operating a pulse echo ranging system is known, wherein a transducer assembly provides transmission and reception of pulses of high frequency acoustic energy at plural substantially different frequencies. An echo profile is generated for signals received at at least a first of the frequencies, and the signal at another of the frequencies is utilized to enhance the recovery of data beyond that obtained from the first signal alone. If echo profiles are recovered for two or more frequencies, the additional profiles may be utilized to enhance the reliability of recovery wanted data. For example, if supernatant liquid contains large quantities of suspended material, acoustic energy at a frequency best suited to detecting a sludge interface may be so attenuated before reaching the interface that detection is not practicable. In this case, the lower frequency signal may provide additional penetration in order to detect the sludge interface and thus improve reliability. Furthermore, if two or more echo profiles are recovered, the profile recovered from a signal which is not heavily reflected by a sludge interface or other interface which it is desired to detect may be utilized as a reference signal against which echoes occurring in the echo profile from a signal at a different frequency may be assessed. Alternatively, the profiles from different frequencies may be summed, or differenced on the basis that the response from an interface to be detected to signals at substantially different frequencies will be substantially different. If the echo responses at different frequencies are available, it may be possible to deduce characteristics such as quantities of suspended solids, layer density, presence of bubbles, and so on from the different responses to the different frequencies.

In the known method, the received signals are combined to provide enhanced information. The kind of combination depends on the measurement environment and conditions which, however, are often not known.

SUMMARY OF INVENTION

An object of the invention is to provide a more universal method for obtaining information on liquids containing significant quantities of suspended materials.

According to the invention there is provided a method of operating an acoustic pulse echo ranging system comprising the steps of:
- transmitting, through a transducer assembly, a series of acoustic energy pulses of increasing or decreasing burst frequencies;
- receiving and converting, for each transmitted energy pulse, associated echoes into an echo function over time;
- storing the obtained echo functions in a two-dimensional pattern whose first dimension is the burst frequency and whose second dimension is the time; and
- evaluating, from the two-dimensional pattern, at least one frequency response function as a function of echo function values over burst frequency at a selected point of time.

The invention advantageously considers not only single echo functions received for different frequencies, but also the functional frequency dependence of echo values at selected points of time. The functional frequency dependence or frequency response function gives information on the nature of the material at the level which corresponds to the selected point of time.

In a first step, selected ones of the echo functions may be evaluated to identify echoes of interest which correspond to interfaces between different layers of material. In a next step, the point of time of a frequency response function is selected with respect to the identified echoes so that the frequency response function is obtained from the middle of a layer and reports on the nature of material of said layer.

The echo functions also may be evaluated to identify potential echoes of interest, wherein by means of the frequency response function one echo of interest, e.g. the strongest or most significant one, is selected from those potential echoes of interest which have the same position on the time axis.

In order to obtain clear frequency information, the received the echoes may be bandpass filtered at frequencies equal to the burst frequencies of the respective associated ones of the energy pulses. This particularly allows for evaluating identified echoes respect to Doppler shifts of their frequencies and thus detecting moving particles or how fast material is precipitating.

BRIEF DESCRIPTION OF THE DRAWINGS

For further description of the invention, reference is made to the accompanying drawings, in which, by way of example.

DETAILED DESCRIPTION OF INVENTION

Figure 1:
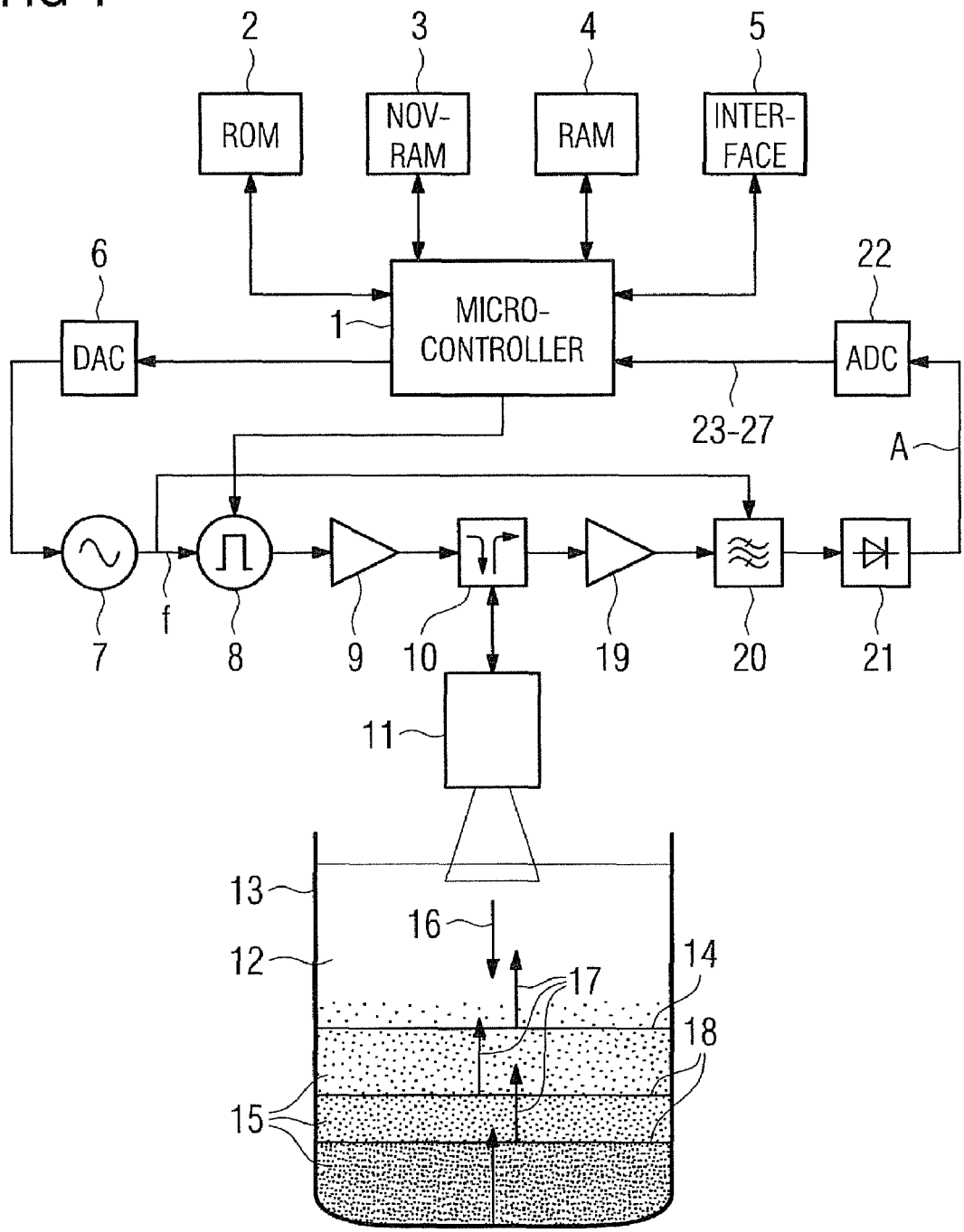
FIG. 1 is a simplified schematic diagram of an acoustic pulse echo ranging system.

Referring to FIG. 1, there is shown a simplified schematic diagram of an acoustic pulse echo ranging system controlled by a microcontroller 1 which operates under a control program stored in read-only memory (ROM) 2, utilizing parameters stored in non-volatile random access memory (NOVRAM) 3, and provided with working memory in the form of random access memory (RAM) 4. An interface 5 provides for the export of measurement data and the import of operating parameters. Data may be exported in the form of a display, telemetry (e.g. bus) signals and/or alarm signals. The microcontroller 1 also controls, via a digital to analog converter 6, a voltage controlled oscillator 7 to successively increase or decrease its output frequency f over a range from e.g. 60 to 800 kHz. A pulse generator 8 is triggered by the microcontroller 1 to generate bursts of the instantaneous frequency f and to apply these bursts via a power amplifier 9 and a multiplexing gate or switch 10 to a wideband acoustic transducer 11. The transducer 11 is mounted with its radiating portion submerged in the liquid content 12 of a tank 13. Above an interface 14, the liquid content 12 is liquid containing suspended material and possibly gas bubbles, while denser sludge phases 15 settle out beneath the interface 14 and above the bottom of the tank 13. The acoustic energy pulses 16, i.e. bursts, transmitted by the transducer 11 are partly absorbed and partly reflected as echoes 17 at the interface 14 and further interfaces 18 between the different sludge phases 15 dependent on the materials in the tank 13. The echoes 17 are received by the transducer 11, amplified by a pre-amplifier 19 and by a narrow bandpass filter 20 filtered at the burst frequencies f of the respective associated ones of the energy pulses 16. The signal amplitude A of the bandpass filtered echo signals is then detected by an envelope detector 21 and applied to an analog to digital converter 22, from where the thus obtained digital echo profiles 23-27 are stored in RAM 4 for further processing.

Figure 2:
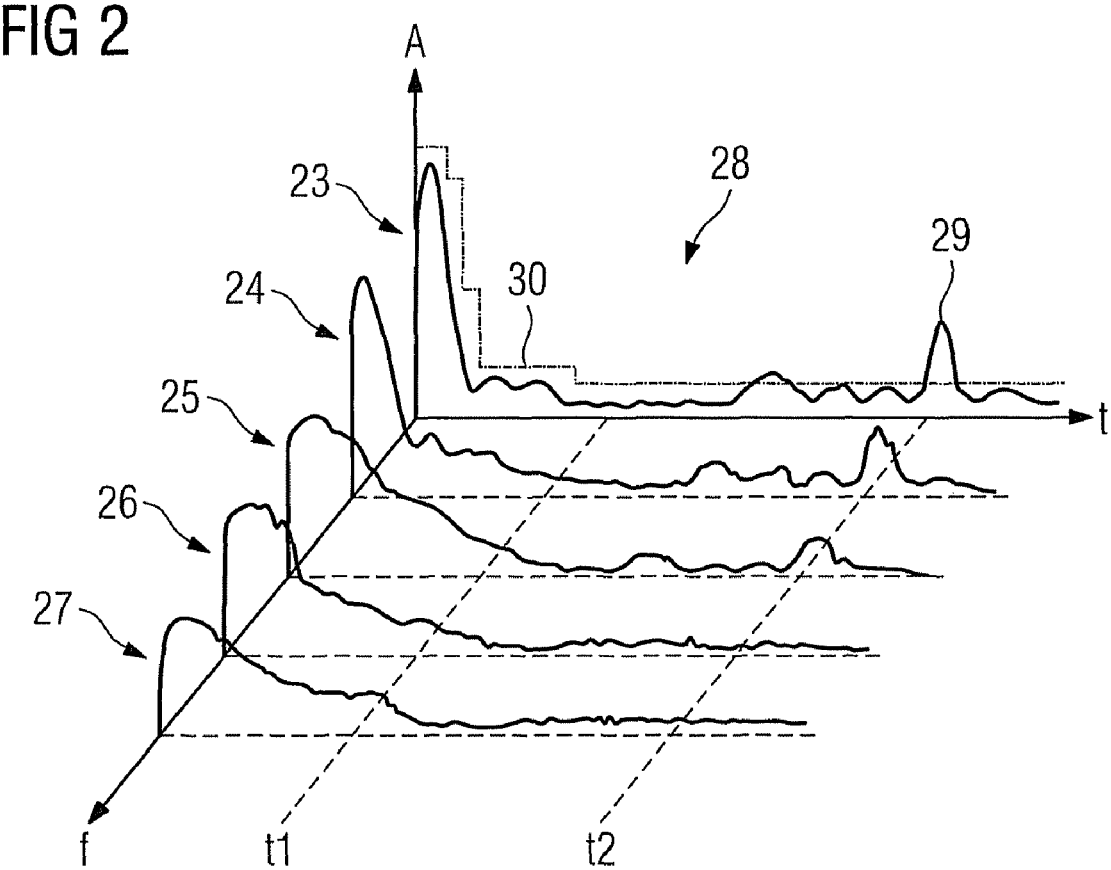
FIG. 2 shows a series of collected echo functions stored in a two-dimensional pattern.

FIG. 2 exemplarily shows the obtained echo functions 23-27 in a two-dimensional pattern 28 whose first dimension is the burst frequency f and whose second dimension is the time t. Wanted echoes, e.g. 29, from the different interfaces 14, 18 and from the bottom of the tank 13 can be identified in the echo functions 23-27 by a plurality of known methods, such as time variable thresholding indicated by reference number 30. From the echo functions 23-27 obtained at different frequencies f, it can be seen that reflection and absorption of the energy pulses 16 strongly depends on frequency.

Figure 3:
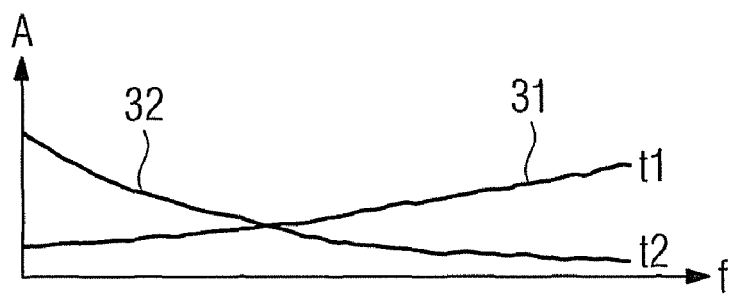
FIG. 3 illustrates two frequency response functions at selected points of time.

FIG. 3 exemplarily shows two frequency response functions 31 and 32 as respective functions of the echo function values over the frequency f at selected points of time t1 and t2. The frequency response functions 31 and 32 are directly obtained from the echo function values of the echo functions 23-27, stored in the two-dimensional pattern 28, by taking the echo function values at a selected point of the second dimension which is the dimension time t. Thus, each frequency response function 31 and 32 consists of or is defined by the echo function values along the first dimension frequency f at the selected point of the dimension time t. In other words, each frequency response function 31 or 32 consists of or is defined by the echo function values over burst frequency at a selected point of time. Thus, the frequency response function 31 or 32 is a set or sequence of values as each echo function 23-27 is. Whereas the echo function 23-27 consists of echo function values over time at a given burst frequency, the frequency response functions 31 and 32 consist of echo function values over burst frequency at a selected point of time. The frequency response functions 31 and 32 give information on the nature of the material in the tank 13 at the fill levels which correspond to the selected points of time t1 and t2. Movement of the material in the tank 13 will lead to Doppler shifts in the corresponding echoes' frequencies which Doppler shifts result in displacements of the echoes, e.g. echo 29, on the frequency axis f. Thus, the Doppler shift allows detecting how fast the material is precipitating and, consequently, whether measures are necessary to facilitate precipitation.

The invention claimed is:

1. A method of operating an acoustic pulse echo ranging system, comprising:
   providing a tank with a liquid content containing suspended material;
   transmitting, through a transducer assembly, a series of acoustic energy pulses of increasing or decreasing burst frequencies to the liquid content in the tank;
   receiving and converting, for each transmitted energy pulse, associated echoes into an echo function over time;
   storing the obtained echo functions in a two-dimensional pattern, a first dimension being the burst frequency and a second dimension being the time; and
   evaluating, from the two-dimensional pattern, a frequency response function consisting of the echo function values over burst frequency at a selected point of time,
   wherein the frequency response function gives information on the nature of the material in the tank at a fill level which corresponds to the selected point of time.

2. The method according to claim 1, wherein the echo functions are evaluated to identify echoes of interest and wherein the point of time of the frequency response function is selected with respect to an identified echo.

3. The method according to claim 1, wherein the echo functions are evaluated to identify potential echoes of interest and wherein by the frequency response function one echo of interest is selected from those potential echoes of interest which have the same position on the time axis.

4. The method according to claim 1, wherein prior to converting the received echoes are bandpass filtered at frequencies equal to the burst frequencies of the respective associated ones of the energy pulses.

5. The method according to claim 2, wherein prior to converting the received echoes are bandpass filtered at frequencies equal to the burst frequencies of the respective associated ones of the energy pulses.

6. The method according to claim 3, wherein prior to converting the received echoes are bandpass filtered at frequencies equal to the burst frequencies of the respective associated ones of the energy pulses.

7. The method according to claim 4, wherein selected echo functions are evaluated to identify an echo of interest and wherein the identified echo is evaluated with respect to a Doppler shift of its frequency.

8. The method according to claim 5, wherein selected echo functions are evaluated to identify an echo of interest and wherein the identified echo is evaluated with respect to a Doppler shift of its frequency.

9. The method according to claim 6, wherein selected echo functions are evaluated to identify an echo of interest and wherein the identified echo is evaluated with respect to a Doppler shift of its frequency.

10. The method according to claim 1, wherein the burst frequencies are distributed over an at least 4 octave-range.

11. The method according to claim 2, wherein the burst frequencies are distributed over an at least 4 octave-range.

12. The method according to claim 3, wherein the burst frequencies are distributed over an at least 4 octave-range.

13. The method according to claim 4, wherein the burst frequencies are distributed over an at least 4 octave-range.

14. The method according to claim 7, wherein the burst frequencies are distributed over an at least 4 octave-range.

* * * * *